United States Patent

Cha

Patent Number: 6,034,842
Date of Patent: Mar. 7, 2000

[54] SUBAMBIENT PRESSURE SLIDER FOR CONSTANT FLYING HEIGHT

[75] Inventor: Ellis Taeho Cha, Santa Clara, Calif.

[73] Assignee: SAE magnetics (H.K.) Ltd., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/708,090

[22] Filed: Aug. 30, 1996

[51] Int. Cl.[7] .................................................. G11B 21/20
[52] U.S. Cl. ............................................................ 360/103
[58] Field of Search ............................................. 360/103

[56] References Cited

U.S. PATENT DOCUMENTS

| | | | |
|---|---|---|---|
| 4,555,739 | 11/1985 | Van et al. | 360/103 |
| 4,673,996 | 6/1987 | White | 360/103 |
| 4,802,042 | 1/1989 | Strom | 360/103 |
| 4,870,519 | 9/1989 | White | 360/103 |
| 5,062,017 | 10/1991 | Strom et al. | 360/103 |
| 5,097,370 | 3/1992 | Hsia | 360/103 |
| 5,128,822 | 7/1992 | Chapin et al. | 360/103 |
| 5,200,868 | 4/1993 | Chapin et al. | 360/103 |
| 5,267,109 | 11/1993 | Chapin et al. | 360/103 |
| 5,287,235 | 2/1994 | Cunningham et al. | 360/103 |
| 5,309,303 | 5/1994 | Hsia et al. | 360/103 |
| 5,327,310 | 7/1994 | Bischoff et al. | 360/103 |
| 5,343,343 | 8/1994 | Chapin | 360/103 |
| 5,396,386 | 3/1995 | Bolasna et al. | 360/103 |
| 5,396,387 | 3/1995 | Murray | 360/103 |
| 5,404,256 | 4/1995 | White | 360/103 |
| 5,420,735 | 5/1995 | Haines et al. | 360/103 |
| 5,430,591 | 7/1995 | Takeuchi et al. | 360/103 |
| 5,473,485 | 12/1995 | Leung et al. | 360/103 |
| 5,550,692 | 8/1996 | Crane | 360/103 |

*Primary Examiner*—Craig A. Renner
*Assistant Examiner*—Angel Castno
*Attorney, Agent, or Firm*—Kenyon & Kenyon

[57] ABSTRACT

An air bearing slider for carrying a read/write element in relation to a rotating disk. The slider comprises a slider body defined by two longitudinal side edges and an air bearing surface including at least a first and a second longitudinally extending rail. Each rail is defined by a leading rail edge substantially surrounded by a step region and having angled faces for contact with varying directional air flow. The air bearing surface may also include leading and trailing rail edges that alternately extend away from the side edges of the slider body. A subambient pressure region may also be generally defined by the step region and inner edges of the longitudinally extending rails.

18 Claims, 6 Drawing Sheets

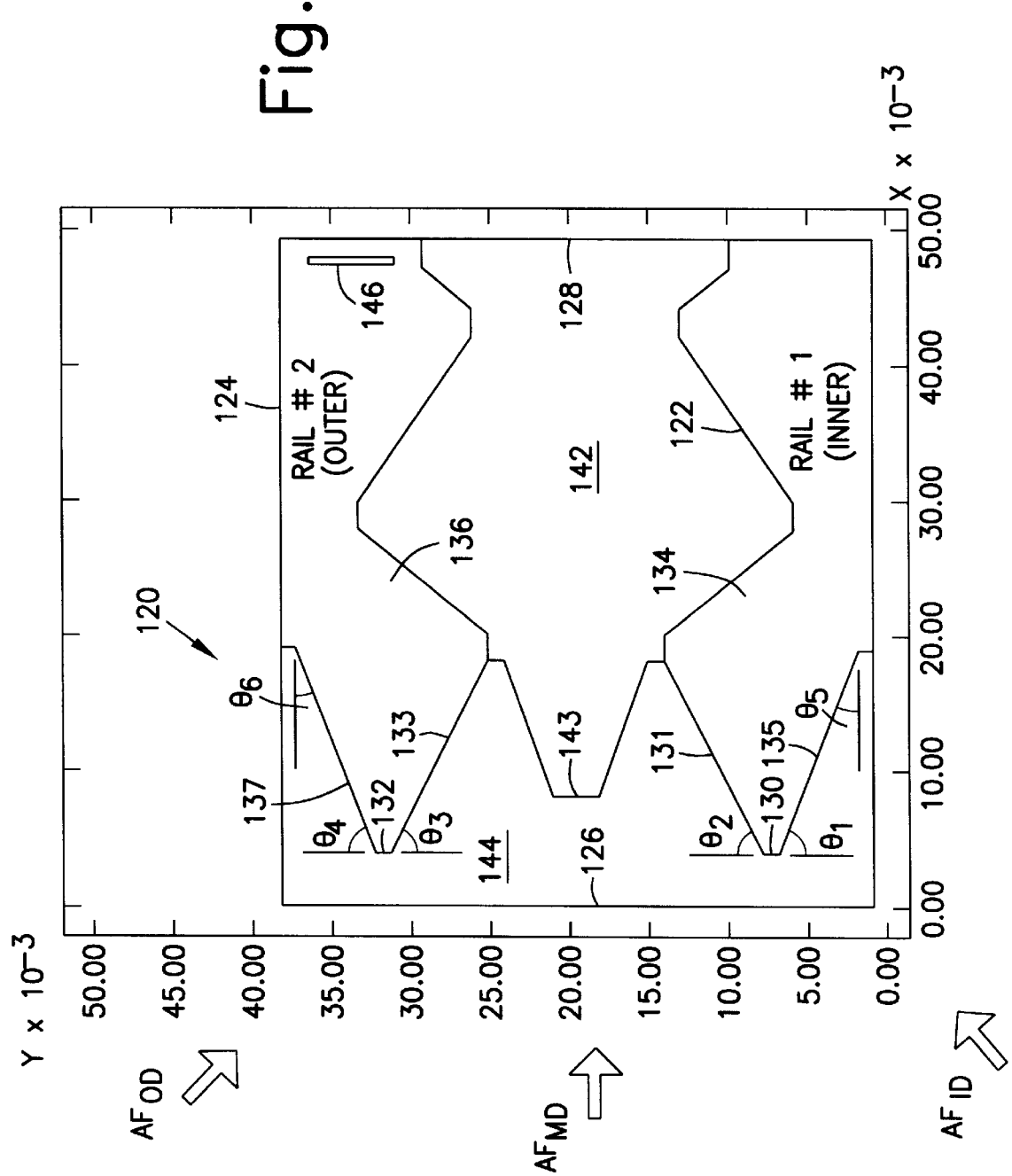

SUBAMBIENT PRESSURE SLIDER FOR CONSTANT FLYING HEIGHT

FIELD OF THE INVENTION

The present invention relates to air bearing sliders, and more particularly, to surface configurations that provide a constant flying height for subambient pressure air bearing sliders.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. For example, there are many advantages for reducing or having a relatively small flying height. A relatively small flying height allows the transducer to achieve greater resolution between different data bit locations and magnetic fields emanating from closely defined regions on the disk surface. Also, a low flying slider is known to provide improved high density recording or storage capacity of magnetic disks which is usually limited by the distance between the transducer and the magnetic media. Narrow separation gaps permit shorter wavelength signals to be recorded or read as a result. At the same time, with the increasing popularity of lightweight and compact notebook type computers that utilize relatively small yet powerful disk drives, the need for a progressively smaller slider body with a lower flying height has continually grown.

It has also been observed that a constant flying height provides desireable benefits which may be more readily achieved through particular ABS designs. Fluctuations in flying height is known to adversely affect the resolution and the data transfer capabilities of the accompanying transducer or read/write element. The amplitude of the signal being recorded or read does not vary as much when the flying height is relatively constant. Additionally, changes in flying height may result in unintended contact between the slider assembly and the magnetic rotating disk. Sliders are generally considered to be either direct contacting, pseudo-contacting or flying sliders which is descriptive of their intended contact with a rotating disk. Regardless of the type of slider, it is often desireable to avoid unnecessary contact with the surface of the spinning magnetic disk so as to reduce the wear on both the slider body and the disk. The deterioration or wear of the recording media may lead to the loss of recorded data, while slider wear may also result in the ultimate failure of the transducer or magnetic element.

What often causes changes to the flying height is the continual high speed movement of the slider across the rotating disk while performing read or write operations. For example, depending on the radial position of the slider, the respective linear velocity of the disk varies. Higher velocities are observed at the outer edge of the rotating disk, while lower velocities are found at the inner edge. As a result, the air bearing slider flies at different relative speeds at different radial positions relative to the disk. Because sliders typically fly higher at higher velocities, there is a tendency for flying heights to increase when positioned above the outer regions of the disk. At the same time, lower velocities at the inner regions of the disk cause the slider to fly lower. Accordingly, slider designs must account for the noticeable effect that variations in radial position, and relative velocity, have on the flying height.

The flying height of a slider is also adversely affected by changes in skew. The skew angle is defined and measured as the angle formed between the longitudinal axis of the slider body and the direction of the air flow tangential to the disk rotation. When the mounted slider is positioned near the inner or outer edges of the spinning disk, its longitudinal axis is often skewed in relation to the direction of the air flow. The longitudinal axis of the slider may be defined as a center line of reference running along the length of the slider body. These angular orientations or skew angles typically vary as a rotary actuator arm and gimbal suspension assembly turns about its pivot point thereby moving the slider in an arcuate path across the rotating disk. In view of the growing demand for compact disk drives having relatively smaller actuator arms, larger skew angles are ever more present because of the shortened arm length. It has often been observed that at skew values above zero, sliders are pressurized at reduced values which cause an undesirable decrease in flying height. Even a relatively moderate skew angle range adversely affects the flying capabilities of a slider. As a result, ABS designs continually attempt to minimize slider sensitivity to changes in skew.

Another fluctuation in flying height may be identified as slider roll. The roll angle is measured and defined by the difference in flying height between the longitudinal sides of the slider. Whenever a slider flies at skew with respect to the direction of the air flow, an unequal pressure distribution tends to occur between the ABS and the disk. This imbalance causes slider roll where one side of the slider body is closer to the disk surface than the other side. A slider, however, is preferably positioned at a constant slider roll regardless of any changes in the flying conditions including differences in tangential velocity between the inner and outer tracks of the rotating disk, and continuous lateral movement above the surface of the disk or varying skew angles.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height. As illustrated in FIG. 1, a flexible gimbal (not shown) often provides the slider with multiple degrees of freedom such as vertical spacing, or pitch angle and roll angle which describe the flying height of the slider.

Although catamaran sliders are initially effective in providing an adequate flying height, they are especially sensitive to varying skew angle ranges and other adverse flying conditions. When the skew angle is increased, such as when the flying slider moves across the rotating disk, the air pressure distribution beneath the rails may become distorted. By accessing both inner and outer portions of a disk at relatively high speed, air is introduced in an uneven amount under each rail which typically causes slider roll as depicted in FIG. 1. As a result, the slider experiences an uneven distribution of pressure which may cause the slider to roll in one direction such that the flying height is not uniform between the ABS rails. The mounted transducer may therefore be unable to operate effectively or accurately perform its data transfer operations. Regardless of the sensitivity of the ABS rails to various skew ranges and other adverse flying conditions, this rail design is widely acknowledged as a general configuration that provides effective pressurization or lift to enable a slider to fly.

In order to counteract the positive pressurization of the flying slider body to provide a low and constant flying height, it is known to form an ABS that also provides negative or subambient pressurization to pull or draw the slider body towards the disk. For example, negative pressure air bearing (NPAB) or self loading sliders have been known to provide a counteracting negative pressure load. In this dual pressurization scheme, the ABS may be generally formed with a leading edge, a trailing edge, side rails, and a cross-rail that extends between the side rails in a basic H-shaped orientation. The cross-rail, which is often positioned closer to the leading edge than the trailing edge of the slider, creates a subambient pressure region trailing the cross-rail and in between the side-rails. The subambient pressure region creates a negative pressure or load that counteracts the positive pressure generated along the side rail portion of the ABS. This counteraction of negative and positive forces has been known to increase the stability and air bearing stiffness of the slider, provide rapid slider takeoff, and reduce its sensitivity to variations in conditions such as changing disk velocity and radial movement which cause fluctuations in flying height. The compensating changes in positive and negative pressure, in accordance with the varying velocity between the inner and outer tracks of the disk, contributes to the overall objective of maintaining a substantially constant and steady flying height. However, the offsetting forces created in a subambient pressurization scheme may often present undesirable effects that actually cause variations in flying height. A NPAB slider often exhibits noticeable roll as well, and a reduction in flying height at skewed conditions because of unequal pressurization or distribution of air beneath the rails.

Another type of ABS rail modification that has been developed is generally known as a transverse pressurization contour (TPC). A TPC may be formed on ABS rails at various locations along the edges of their air bearing surface areas. This has been observed to provide some reduction in flying height variations at skew angles in certain applications. When there is a transverse component of air flow directed across the face of the rail, the contour provided by a transverse edge of a TPC rail may experience positive pressurization while a counter balancing negative pressurization is produced in a contour along the other transverse edge of the rail. As a result, the overall pressure distribution across the ABS may remain relatively unchanged over some range of varying skew angles where the transverse component of air flow tends to cause unequal pressurization.

All of the aforementioned ABS configurations and modifications for air bearing sliders attempt to achieve a low and constant flying height. Different degrees of effectiveness are provided by these ABS designs which overall do not control flying height, or pitch and roll angles very well. For example, many existing ABS designs have been observed to exhibit an extremely increased slider roll angle over outer tracks regions of a disk. These configurations also typically fail to control the increase in slider pitch angle when moving from inner track to the outer track regions. Thus, there exists a need for an ABS configuration for an air bearing slider that effectively maintains constant flying height and controls roll angle regardless of constantly changing flying conditions such as the difference in relative velocity at the outer and inner regions of a disk, the relative positioning of a slider over a rotating disk, and varying skew angles ranges.

SUMMARY OF THE INVENTION

The present invention provides a subambient pressure air bearing slider with an air bearing surface (ABS) that provides a low and constant flying height in the presence of varying directional air flow. The ABS configurations described herein provide improved control of the flying height for an air bearing slider whereby the slider roll angle is maintained relatively constant under various operating conditions for a variety of rotating disk drive assemblies. The slider comprises a slider body defined by two side edges extending longitudinally along the slider body having an air bearing surface including at least a first and a second longitudinally extending rail wherein each rail is defined by a leading rail edge having angled faces for contact with varying directional air flow.

In one embodiment of the present invention, the air bearing slider includes a slider body defined by at least one side edge and an air bearing surface having a first and a second rail each extending along a portion of a side edge of the slider body having a leading rail edge with angled faces for contact with varying directional air flow substantially surrounded by a contiguous leading step region. The step leading edge is formed adjacent a relatively deeper step region formed towards the trailing edge of the air bearing surface.

In another embodiment, the slider is formed with an air bearing surface having at least two rails extending along a portion of a longitudinal side edge of the slider body. The inner and outer edges of each rail are formed with kinks. A transducer, or some other type of read/write element such as an optical head, may be carried by the slider body.

In yet another embodiment, a slider comprising a slider body with two longitudinal side edges and an air bearing surface having at least a first rail and a second rail extending along the side edges of the slider body each with an inner edge and a leading edge bent away from their respective side edges substantially surrounded by a leading step region and wherein the inner rail edges define a subambient region.

BRIEF DESCRIPTION OF THE DRAWINGS

FIG. 6 is a bottom plan view of another subambient pressure air bearing slider in accordance with the present invention particularly illustrating the configured slider rails and effective ABS area.

DETAILED DESCRIPTION OF THE INVENTION

Figure 1:
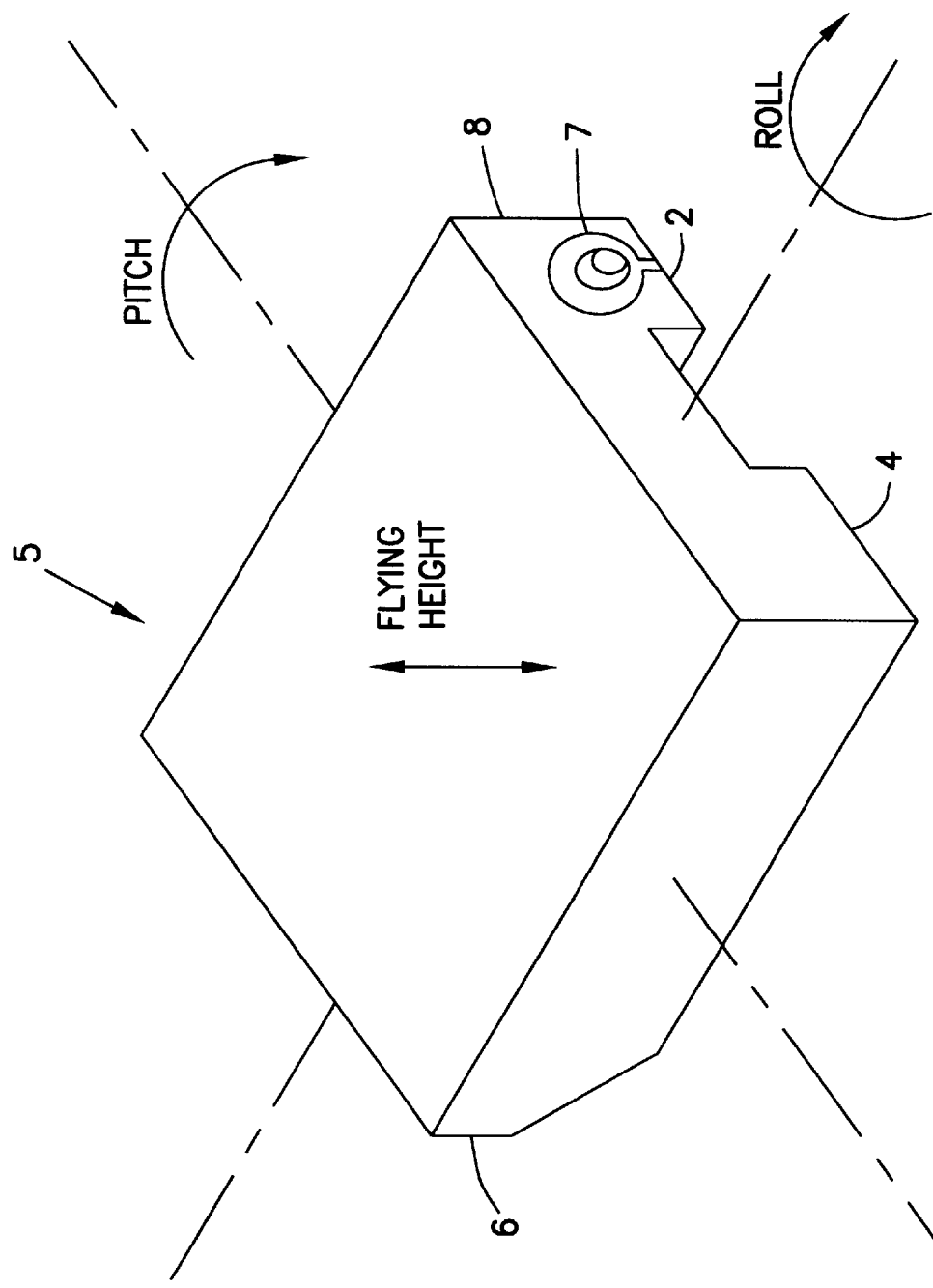
FIG. 1 is a perspective view of a flying slider with a read and write element assembly having a tapered conventional catamaran air bearing slider configuration.
Figure 2:
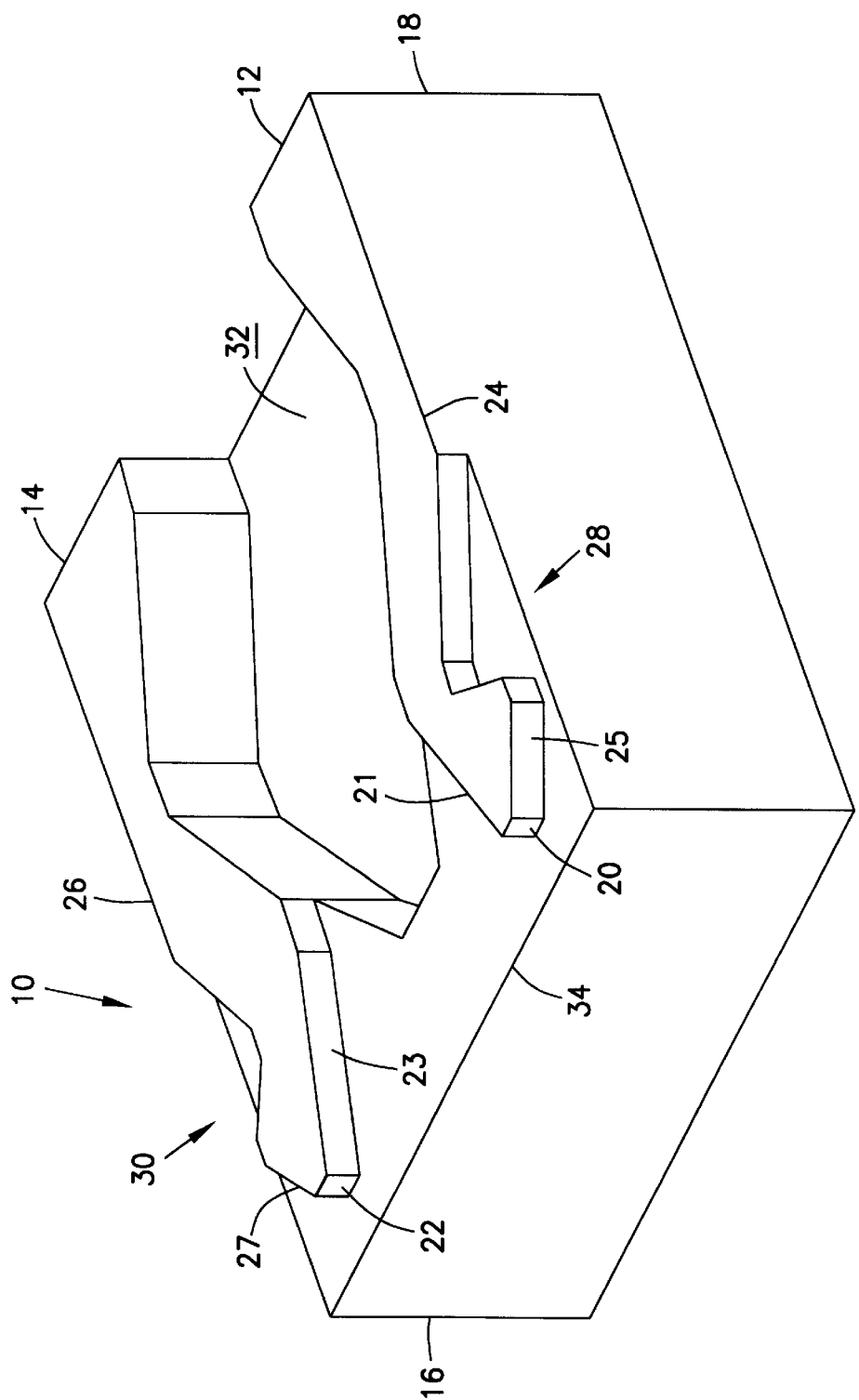
FIG. 2 is a perspective view of an ABS for a subambient pressure air bearing slider in accordance with the present invention as viewed from its leading edge.

FIG. 2 is a general perspective view of the bottom side of an ABS 10 for a subambient pressure step slider in accordance with the present invention as viewed from its leading edge. It will be understood that for purposes of describing particular features of an ABS as follows, the entire slider body, which may be formed from a substrate material such as $Al_2O_3TiC$, is not shown. The ABS 10 illustrated in FIG. 2 includes a pair of rails 12 and 14 each having effective air bearing areas 24 and 26. The inner rail 12 and the outer rail 14 generally extend from the leading edge 16 toward the trailing edge 18 of the ABS. As shown in FIG. 2, the ABS rails 12 and 14 are shaped in a desired configuration by conventional techniques in accordance with one aspect of the present invention. The leading edges 20 and 22 of the rails may be formed with angled faces 21 and 25, and 23 and 27, respectively. Kinks 28 and 30 may also be formed on the outer edges of the rails 12 and 14. Other portions of the ABS 10 may further include a relatively deep etch step region 32 formed towards the trailing edge 18 of the ABS. Meanwhile, a relatively shallow step region 34 may also be formed at the leading edge 16 of the ABS that substantially surrounds the leading rail edges 20 and 22. The result of this ABS configuration is a relatively constant flying height for the slider.

The leading edge 16 for the slider ABS 10 shown in FIG. 2 may be shaped to effectively control both the slider pitch and roll angles. In a preferred embodiment, as illustrated in FIG. 2, the leading edges 20 and 22 of the ABS rails 12 and 14 are etched at an angle to form a generally pointed portion such that angled faces 21 and 27 may be approximately perpendicular to the air flow when the slider is at an outer diameter track region of a rotating disk, and angled faces 23 and 25 may be approximately perpendicular to the air flow when the slider is at an inner diameter track region. It will be understood that the angled faces 21, 25, 23 and 27 of the leading rail edges 20 and 22, respectively, may also be applied to any number of rail configurations other than the one shown in FIG. 2.

Figure 3:
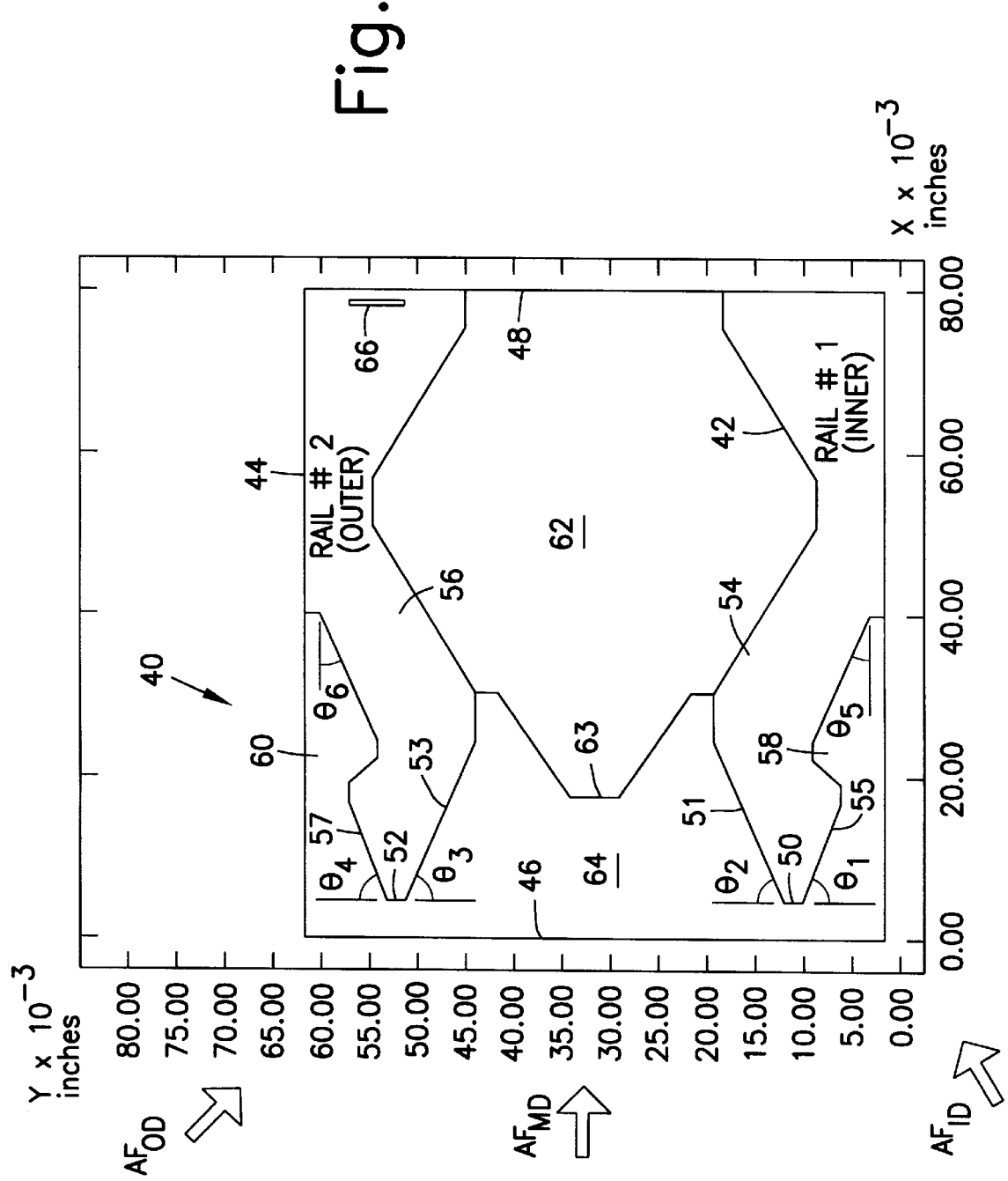
FIG. 3 is a bottom plan view of another subambient pressure air bearing step slider in accordance with the present invention illustrating the direction of air flow (AF) for different slider positions at inner, outer and middle diameter regions of a rotating disk.

Another embodiment of the present invention is shown in FIG. 3 from the bottom view of a preferable subambient pressure air bearing slider. The general direction of air flow with respect to the changing position of the slider ABS 40 at the outer, middle and inner regions of a disk, is illustrated in FIG. 3 by arrows $AF_{OD}$, $AF_{MD}$, and $AF_{ID}$, respectively. It must be recalled that sliders are commonly attached to actuator arm and gimbal assemblies that rotate about a pivot point thereby changing the direction of the air flow with respect to the ABS of the slider as the slider moves across the rotating disk in between inner and outer diameter regions. While the present invention is applicable to sliders of various sizes, the scale provided in FIG. 3 shows the overall dimensions of the slider ABS 40 to be approximately 0.08 inches in length, 0.06 inches in width and 0.017 inches in height (not shown). Sliders having these relative dimensions are generally referred to as nanosliders. The leading edges 50 and 52 of ABS Rail #1 42 and #2 44 are etched at angles $\Theta_1$ and $\Theta_2$, $\Theta_3$ and $\Theta_4$, with respect to the leading edge 46 of the slider, respectively, and may be formed with kinks 58 and 60. The angles $\Theta_1$–$\Theta_4$ may be equal or different, and in either event, each may range from approximately 5 degrees to 85 degrees, and preferably greater than 45 degrees. The specifically selected angles may be varied to obtain relatively constant roll angle and flying height for various skew angle ranges, and may correspond to different types of disk drives with actuator arm assemblies having various arm lengths which may result in varying skew angle ranges. As the slider flies above the surface of a rotating disk the generated air flow runs underneath the ABS Rail #1 42 and Rail #2 44, and in between the rails, towards the trailing edge 48 of the slider. Positive load or pressurization is generated as the air flows beneath the step formed by leading edges 50 and 52 of ABS rails 42 and 44, respectively, thereby creating the necessary lift to enable the slider to fly. In order to achieve an appropriate flying height for the slider, counteracting negative pressurization may be provided when air passes over the shallow step region 64 formed at the leading ABS edge 46 and into the deep etch step region 62 towards the trailing edge 48 of the slider ABS. While the relatively deep etch step 62 and shallow step regions 64 may be etched, ion milled, or otherwise formed, at different depths with respect to the height of the ABS rails 42 and 44, the deep etch is preferably formed at a depth of approximately 70 microinches to approximately 200 microinches, and the shallow step is preferably formed at a depth of approximately 10 microinches to approximately 50 microinches, each relative to the height of the rails. The transitional area between the deep step 62 and shallow step 64 regions may also vary in shape, and may be defined by a nonlinear boundary 63 as specifically shown in FIG. 3.

The ABS illustrated in FIG. 3 provides a subambient pressure air bearing slider with a relatively constant flying height, and minimal variations in roll angle. The effect of the step formed by angled faces 51 and 55, and 53 and 57 of ABS Rails #1 and #2, respectively, vary according to the direction of the air flow. The direction of the air flow changes with respect to the leading edge 46 of the slider ABS 40 according to the position of the slider relative to the air flow as it moves between inner and outer diameter regions of the rotating disk. Regardless of the slider position, the air flow is initially drawn into the shallow step region 64 formed at the leading edge of the ABS 46. At inner diameter regions of a rotating disk (not shown), the angled faces 53 and 55 are substantially perpendicular to the direction of the air flow $AF_{ID}$ as shown in FIG. 3. The pressurization resulting from the step effect is optimized here by selecting appropriate valves for $\Theta_1$ and $\Theta_3$, in order to compensate for the decrease in lift ordinarily experienced by a slider when positioned at inner diameter regions where air velocity is generally lower. Similarly, the effect of the step is also felt at outer diameter regions by selecting appropriate values for $\Theta_2$ and $\Theta_4$, where generally air velocities are higher. In this outer region, the direction of air flow $AF_{OD}$ is substantially perpendicular to the angled faces 51 and 57. As shown in FIG. 3, an intermediate effect of the pressurization due to the step formed by leading edges 50 and 52 is also felt at middle track diameter where the angled faces are neither parallel nor perpendicular to the air flow $AF_{MD}$. The varying pressurization resulting from the angled leading edges 50 and 52 of the ABS rails 42 and 44 provide a relatively constant slider flying height at various disk locations, and improved data transfer capabilities between the transducer 66 and a spinning magnetic disk across what may be referred to as the read/write gap (R/W gap).

As shown in FIG. 3, the inner rail 42 and the outer rail 44 may have effective air bearing surface areas 54 and 56 unique to each rail, respectively. For example, inner rail 42 may be formed with an effective area and compression length as shown. As the skew angle changes and the slider moves towards outer diameter regions, the decrease of the effective surface area and compression length due to side leakage (reduction in lift where air leaks out of the sides of the rail) is minimized as a result of the shaped air bearing surface 54 of the ABS rail shown in FIG. 3. When the slider moves to inner diameter regions, the effective surface area and compression length also decreases for the same reasons. Again, the uniquely configured air bearing surface 54 minimizes the effect of the loss in effective surface area and compression length at inner diameter regions. The unique configuration of the air bearing surface 56 for the outer rail 44 provides similar results at various disk regions. As shown in FIG. 3, the leading edges 50 and 52 for each particular rail may be generally bent towards the middle region of the slider ABS 40. The leading edge 52 of the outer rail 44, which typically contains the read/write element or transducer 66, may be generally aligned with the direction of the air flow $AF_{ID}$ to maintain adequate pressurization when the slider is in position at inner diameter regions of the disk in order to compensate for the typically lower air velocity in this region. The leading edge 50 of the inner rail 42 is similarly aligned with the direction of the air flow $AF_{OD}$ when the slider is positioned at outer diameter regions of the disk in order to provide sufficient lift and maintain a relatively constant flying height. As shown in FIG. 3, the trailing edges of the rails 42 and 44 may also be directed towards the middle of the slider ABS 40 to account for changes in directional air flow. When flying at outer diameter regions, the air flow $AF_{OD}$ may be generally aligned with the trailing edge of the outer rail 44. When positioned at inner diameter regions, the air flow $AF_{ID}$ may be similarly aligned with the trailing edge of the inner rail 42. As a result of this unique configuration, each rail maintains sufficient pressurization at a wide variety of skew angles whether the slider is positioned at outer, middle or inner regions of the disk.

In FIG. 3, it will also be noticed that the individual air bearing surface areas for the ABS rails may be different depending on their relative locations over a rotating disk. Rail #1 may be identified as the inner rail, and Rail #2 may be identified as the outer rail in accordance with their relative positions to the center of the disk. Because the air velocity is known to be typically greater at outer diameter regions proximate to Rail #2 than at inner diameter regions proximate to Rail #1, the effective area for Rail #2 may be configured differently than for Rail #1 to offset the difference. For example, Rail #1 may be configured in accordance with the present invention to generally have a greater relative effective surface area and compression length than other Rail #2 to compensate for the lower air flow velocity at inner diameter regions of the rotating disk. As a result, these differently shaped rails account for the different flying conditions uniquely experienced by each rail, and contribute to more balanced pressurization of the rails so as to reduce variations in slider roll angle. Of course, depending on the overall width of the slider, the difference in flying conditions for each rail will vary accordingly. In any event, the individualized air bearing surfaces formed in accordance with the present invention provide for more control of slider roll angle and a constant flying height.

The leading rail edges 50 and 52 shown in FIG. 3 may also include kinks 58 and 60 formed on the inner and outer rails 42 and 44, respectively. These kinks 58 and 60 may be formed depending on the values of $\Theta_1$ and $\Theta_5$, and $\Theta_4$ and $\Theta_8$, respectively. For example, $\Theta_1$ may be independently varied to provide sufficient pressurization from the step effect particularly at inner diameter regions. But at the same time, angle $\Theta_5$ performs this function and also determines the extent to which the leading edge 50 of the inner Rail #1 42 is bent towards the middle portion of the slider ABS 40 to maintain adequate pressurization and alignment with the air flow $AF_{OD}$ particularly at outer diameter regions. Similarly, a kink 60 may be formed on the outer rail 44 as a result of particular values for $\Theta_4$ and $\Theta_6$. Angle $\Theta_4$ may be varied to generate adequate pressurization resulting from the step effect and air flow particularly at outer diameter regions of $AF_{OD}$. Meanwhile, angle $\Theta_6$ performs this function and also allows the outer Rail #2 leading edge 52 to be aligned with directional air flow at inner diameter regions of $AF_{ID}$. As a result, $\Theta_1$ and $\Theta_5$, and $\Theta_4$ and $\Theta_6$ may be changed, respectively, independent from each other thereby forming kinks 58 and 60 on Rail #1 and Rail #2, respectively. Kinks 58 and 60 may also be formed so as to reduce the compression length of the rails 42 and 44 when the slider has zero skew angle at middle diameter regions where the air flow $AF_{MD}$ is substantially parallel with the longitudinal axis of the slider ABS 40. In these regions, adequate pressurization may be provided by some intermediate step effect at the leading rail edges 50 and 52, and maintained unusually long if the air is permitted to flow uninterrupted along the entire length of the rails 42 and 44. As a result, excessive pressurization of the ABS Rails #1 and #2 may be controlled by their respective kinks 58 and 60.

It should be noted that in order to avoid relatively large skew angles which are known to significantly hinder slider pressurization and lift, it is common to define zero skew angle near middle diameter regions. In this manner, skew angle values remain relatively low regardless of whether the slider is skewed towards the outer or the inner regions of a disk (±Φ). Of course, zero skew may be defined near the inner region of a disk where the effective surface area and compression length of the ABS may be greatest in an attempt to compensate for the relatively low air velocity in this region. But the skew angle values generally become significantly higher in this arrangement, and tend to have a counterproductive effect on pressurization of the slider as it moves outward towards other regions of the disk. In either example, when flying at skew, the drop in pressurization and lift ordinarily occurring with generally rectangular shaped rails is minimized by the shaped air bearing surface formed in accordance with the present invention. The overall result of the ABS configurations provided by the present disclosure is a slider that is capable of flying at a more constant height while at skew, and with greater control of pitch and roll angles.

Figure 4:
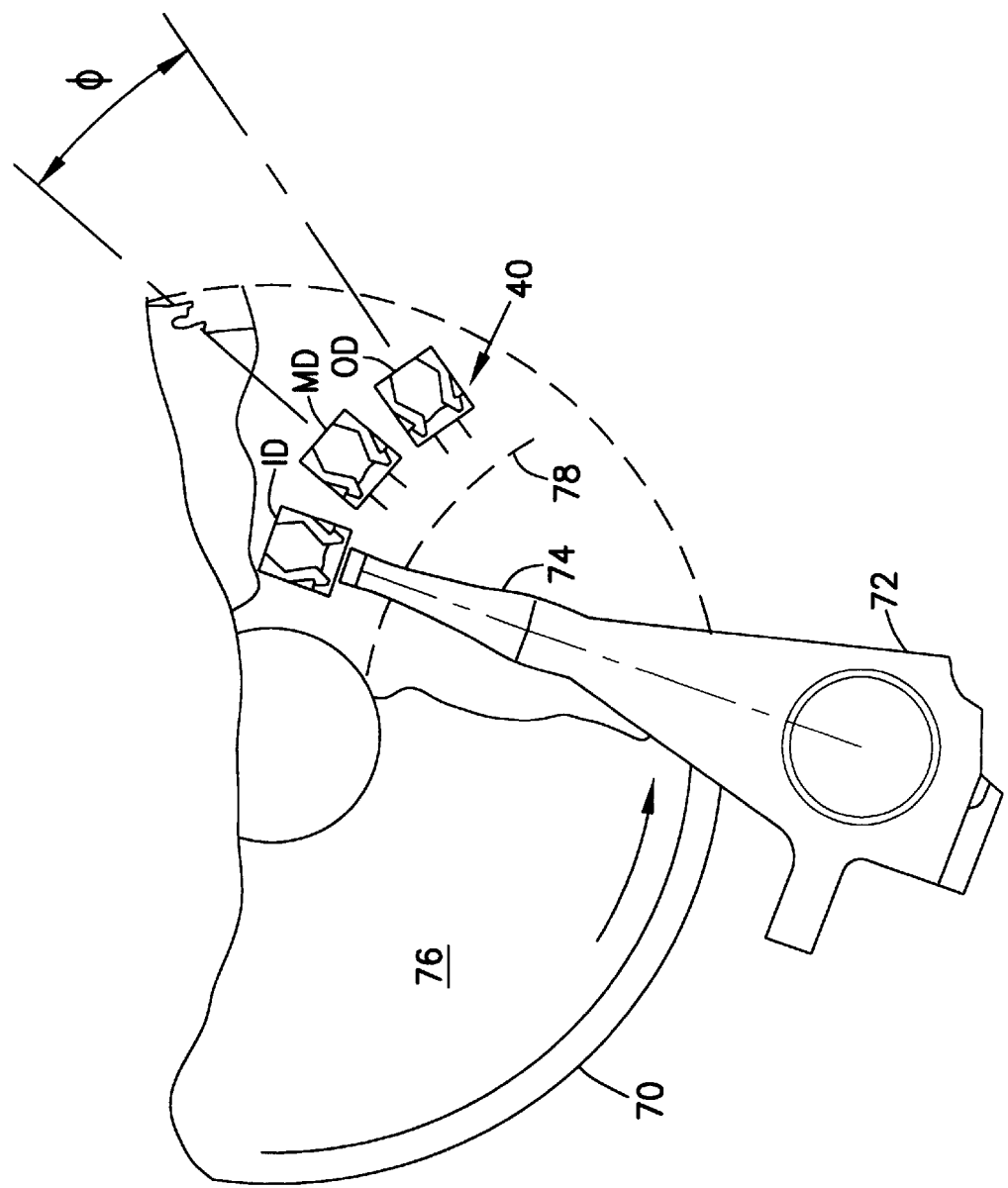
FIG. 4 illustrates a top view of a mounted air bearing slider in accordance with the present invention (not drawn to scale).

In FIG. 4, another embodiment of the present invention is shown where the mounted slider (not drawn to scale) is suspended below the rotating magnetic disk 70 by an actuator or track arm and gimbal suspension assembly 72. The slider is mounted onto a gimbal 74 which allows for varying degrees of free movement of the slider relative to the disk surface 76. The arm may move in a linear motion in a manner known as linear access (not shown) where the read/write element or head moves across a rotating disk in a relatively straight path. Alternatively, the arm and gimbal assembly 72 may rotate about an axis or pivot point in what is commonly referred to as a rotary actuator. The gimbal 74 and slider may be joined by a track arm and gimbal suspension assembly 72 through a rotary actuator which positions the slider over selected individual data tracks on the magnetic surface 76 in an arcuate path 78. In either scheme, the gimbal 74 provides a flexible yet resilient connection that allows the flying slider and accompanying transducer to follow the topography of the spinning disk at different disk locations. When the slider ABS 40 in FIG. 4 is positioned in the middle diameter region (MD) of the rotating disk, the skew angle is zero since the longitudinal axis of the slider is parallel with the air flow. An intermediate effect of the pressurization due to the step formed by angled faces is felt in the middle diameter regions of the disk. However, as the slider ABS 40 moves out towards outer diameter regions (OD), the air begins to flow substantially perpendicular to the step formed by certain angled faces for each rail to generate adequate pressurization. When the slider ABS 40 moves towards inner diameter regions (ID), the air tends to flow substantially perpendicular to the step formed by other angled faces for each rail to provide necessary pressurization in order to generate sufficient lift. As a result, the slider ABS 40 is less sensitive to changes in air flow and skew because of the multiple angled faces which compensate for changes in pressurization and flying conditions at particular disk locations.

Figure 5:
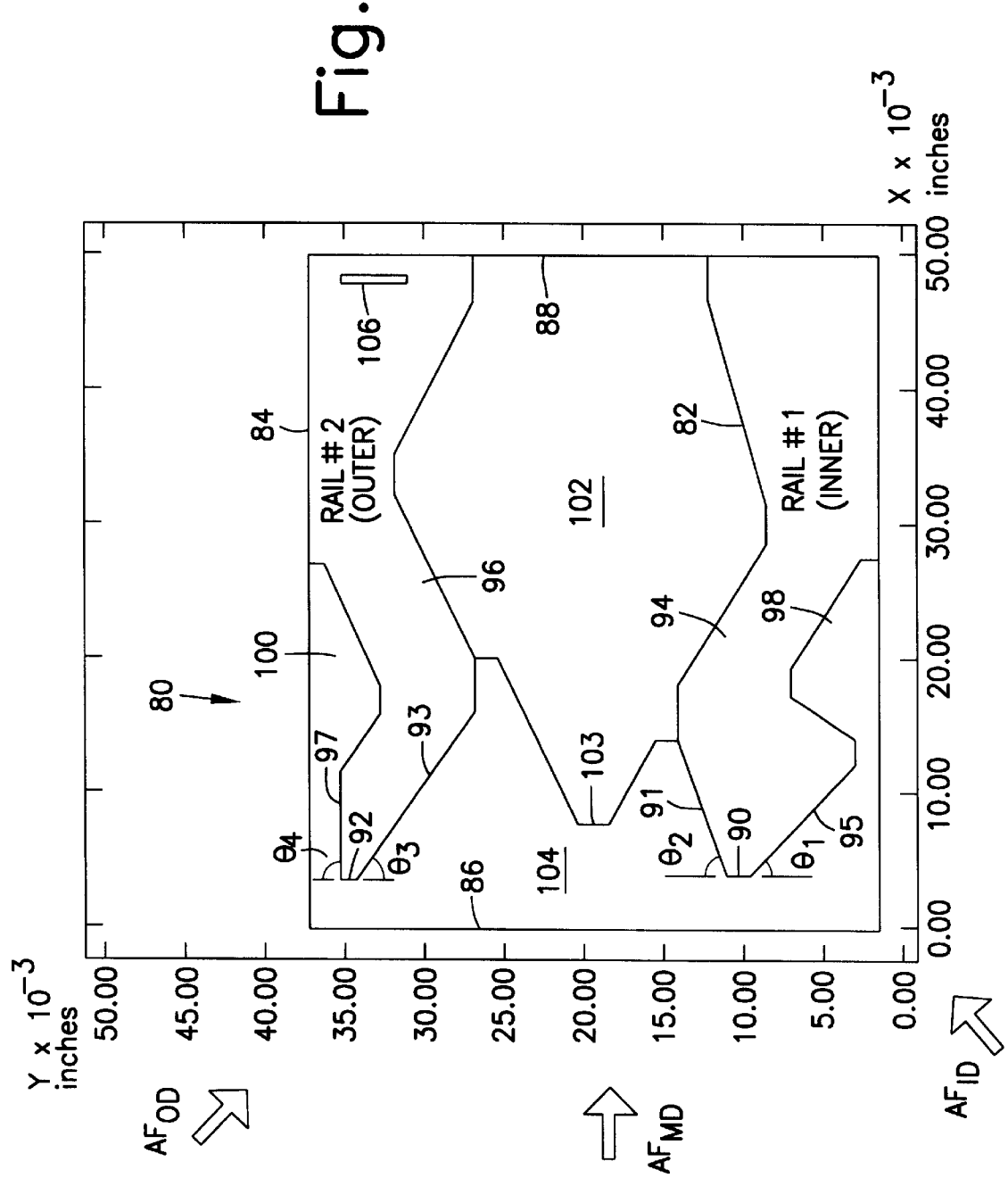
FIG. 5 is a bottom plan view of a subambient pressure air bearing slider in accordance with another embodiment of the present invention particularly illustrating the formed leading edges of the slider rails.

As shown in FIG. 5, the leading edges of air bearing surfaces for step sliders may also be configured and optimized as illustrated in accordance with the present invention. The approximate overall dimensions of the step slider in FIG. 5 is 0.05 inches in length, 0.039 inches in width and 0.012 inches in height (not shown). Sliders with these relative dimensions are generally referred to as picosliders. The general direction of air flow with respect to the changing position of the sliders at the outer, middle and inner regions of a rotating disk is again illustrated by arrows $AF_{OD}$, $AF_{MD}$, and $AF_{ID}$, respectively. As explained above, the varying directional air flow is attributed to the change of slider position as it moves across the surface of a rotating disk in an arcuate path which often causes the slider to roll at skew angles, absent the benefits provided by the present invention. The ABS configuration 80 illustrated in FIG. 5, which is formed in accordance with another aspect of the present invention, includes a pair of rails 82 and 84. The ABS rails 82 and 84 are shaped in a desired configuration by conventional techniques in accordance with one aspect of the present invention. The leading edges 90 and 92 of the rails may be formed with angled faces 91 and 95, and 93 and 97, respectively, by any of a variety of known etching processes before the ABS is further etched or otherwise formed. Kinks 98 and 100 may also be formed on the outer edges of the rails 82 and 84. Other portions of the ABS for the slider 80 further include a relatively deep etch step region 102 which may be formed towards the trailing edge 88 of the ABS. Meanwhile, a relatively shallow step region 104 may also be formed at the leading edge 86 of the ABS that substantially surrounds the leading rail edges 90 and 92.

The leading edges 90 and 92 of the ABS rails 82 and 84 shown in FIG. 5 may be shaped to effectively control both the slider pitch and roll angles, particularly when positioned at skew. Depending on the applicable skew angle range, the shape of the leading edge area may be varied to control the roll angle. In another preferred embodiment of the present invention, as illustrated in FIG. 5, the leading edges 90 and 92 of the ABS rails 82 and 84 may be etched at an angle to form a generally pointed portion such that angled faces 91 and 97 will be approximately perpendicular to the air flow when the slider is at an outer diameter track of a rotating disk, and angled faces 93 and 95 will be approximately perpendicular to the air flow when the slider is at an inner diameter track. The step effect generated by the angled faces in these particular disk locations permit incoming air to be drawn underneath the ABS rails to create the necessary pressurization for lift, and the resultant air bearing. Specifically, angled faces 91 and 95 in FIG. 5 may be formed at an angle $\Theta_1$ and $\Theta_2$, respectively, at the leading inner rail edge 90. The angles $\Theta_1$ and $\Theta_2$ may be varied to provide relatively constant roll angle while a slider flies at skew, and may be equal or different, and in either event, each may range from approximately 5 degrees to 85 degrees. Similarly, angled faces 93 and 97 may be formed at angle $\Theta_3$ and $\Theta_4$, respectively, at the leading outer rail edge 92. The varying ranges of $\Theta_3$ and $\Theta_4$ also correspond to particular disk drive configurations, and may be equal or different. In this preferred embodiment, $\Theta_4$ may be approximately 90 degrees. The specific angles $\Theta_1$–$\Theta_4$ may correspond to different types of disk drives and actuator arm assemblies having various arm lengths which may result in varying skew angle ranges. The rails 82 and 84 each have overall effective air bearing surfaces 94 and 96, and may be formed with kinks 98 and 100, respectively, to provide for the resulting configuration.

As the slider flies above the surface of a rotating disk, the generated air flow runs underneath the ABS Rail #1 82 and Rail #2 84, and in between the rails, towards the trailing edge 88 of the slider. Positive load or pressurization is generated as the air flows beneath the ABS rails 82 and 84 thereby creating the necessary lift to enable the slider to fly. In order to achieve an appropriate flying height for the slider, counteracting negative pressurization may be provided when air passes over the shallow step region 104 formed at the leading edge 86 and into the deep etch step region 102 towards the trailing edge 88 of the slider. The counteracting subambient pressurization for the ABS shown in FIG. 5 is provided by negative pressure regions including the volume of space generally defined by the ABS rails 82 and 84 and the shallow step region 104. While the deep etch step 102 and shallow step 104 regions may be etched, ion milled or otherwise formed, at different depths with respect to the height of the ABS rails 82 and 84, the deep etch is preferably formed at a depth of approximately 70 microinches to approximately 200 microinches, and the shallow step is preferably formed at a depth of approximately 10 microinches to approximately 50 microinches, each relative to the height of the rails. The transitional area between the deep step 102 and shallow step 104 regions may also vary in shape, as illustrated in FIG. 5, and may be defined by a nonlinear boundary 103 which separates the different regions. In order to vary the size and volume of air flow received by the leading step region 104 and the subambient pressure region 102, the boundary 103 may be shaped in numerous ways including the nonlinear configuration illustrated in FIG. 5. The ABS design 80 shown in FIG. 5 results in a slider that exhibits a controlled and relatively flat flying height and roll angle which assists the mounted transducer 106, or any other data transfer element including optical heads, in performing reading and writing operations. To assist in the proper positioning of the transducer 106, suitable coverings formed from materials such as alumina (not shown) may be used to ensure that the mounted element is held securely by the slider.

As shown in FIG. 5, the leading shallow step region 104 substantially surrounds or wraps around the leading edges 90 and 92 of the ABS rails 82 and 84. As the air flows into the shallow step region 104, initial pressurization is achieved when the air is then drawn underneath the leading edges 90 and 92 of the rails 82 and 84. As explained above, the amount of pressurization may be determined by on the angle of incidence of the air flow, and the angled faces and kinks formed on each rail. For example, as the air flows across step region 104 towards the kink 98 and the angled face 95 formed by angle $\Theta_1$ of the inner ABS rail 82, adequate pressurization is achieved particularly at inner diameter regions, and maintained in part by the generally aligned trailing edge of the inner rail as shown in FIG. 5. At outer diameter portions, angled face 91 formed by angle $\Theta_2$ of the inner rail 82 varies the amount of pressurization needed to generate lift which is maintained in part by the generally aligned and bent leading edge of the inner Rail #1. When the air flows generally across step region 104 towards the kink 100 and the angled face 97 formed by angle $\Theta_4$ of the outer ABS rail 84, necessary pressurization is provided when the slider ABS 80 is positioned particularly at outer diameter regions, and maintained in part by the generally aligned trailing edge of the outer rail. At inner diameter portions, angled face 93 formed by angle $\Theta_3$ of the outer rail 84 varies the amount of pressurization needed to generate lift which is maintained in part by the generally aligned and bent leading edge of the outer Rail #2. The selection of appropriate values for angles $\Theta_1$–$\Theta_4$ affect the extent of pressurization for each rail 82 and 84 and may be chosen by considering particular skew angle variations and directional air flow velocity. It should be noted that for both rails 82 and 84 shown in FIG. 5, portions of the leading rail edges 90 and 92 may be formed that are nonangled and substantially parallel to the leading edge 86 of the slider ABS 80. At middle diameter regions of a rotating disk, the air generally flows across the shallow step region 104 into this particular step region to provide sufficient pressurization as to each rail 82 and 84, and is carried throughout their respective rail lengths. When excessive lift is created as a result of the relatively longer compression lengths of each rail 82 and 84, the formed kinks 98 and 100 may effectively reduce this undesirable effect at middle diameter regions where the skew angle is approximately zero. As a result, the overall shape and size of the leading shall step region 104 may vary according to relative dimensions of the rail kinks 98 and 100.

The shallow step region 104 may be etched or otherwise formed at varying depths relative to the height of the rails 82 and 84. The depth of this step region 104 affects the amount of pressurization that is needed to generate sufficient lift to enable the slider to fly. The shallow step may generally be formed at depths of approximately 10 microinches to 50 microinches. Because insufficient pressurization may be generated when the shallow etch region 104 is formed relatively too deep or too shallow, an appropriate depth may be optimally determined to pressurize the incoming air depending on the particular disk drive layout and range of skew angles. Of course, this depth may be considered in combination with other parameters that affect pressurization such as the kinks 98 and 100 and the angled faces formed by $\Theta_1$–$\Theta_4$ on the rails 82 and 84, respectively. This improved ABS configuration, in accordance with one aspect of the present invention, provides for more uniform pressurization of a negative pressure air bearing slider. A more constant flying height is therefore provided to enable more reliable and improved performance from a mounted transducer 106, or any other type of reading or writing element.

The overall ABS configuration of FIG. 5, aside from its leading edge area, also provides a more constant flying height when the slider is flying at skew. For example, when the slider moves towards inner or outer diameter regions, the decrease of the effective surface area and compression length for the rails 82 and 84 due to side leakage is minimized as a result of shaped air bearing surfaces 94 and 96 where the leading and trailing edges of rails 82 and 84 generally bend toward the middle region of the slider body as shown in FIG. 5. The shape of rails 82 and 84 correspond to the gradual changes within a skew angle range, and direction of the air flow AFID from inner disk regions to middle disk regions $AF_{MD}$, and to outer disk regions $AF_{OD}$, in order to compensate for the drop in pressurization ordinarily experienced by sliders when flying at skew angles. As a result, the overall ABS configuration shown in FIG. 5 compensates for changes in directional air flow at different regions of the disk by providing adequate pressurization despite changes in flying conditions including varying skew angles, and change in air velocity.

Another embodiment of the present invention is shown in FIG. 6 from the bottom view of a preferable subambient pressure air bearing slider. The general direction of air flow with respect to the changing position of the slider ABS 120 at the outer, middle and inner regions of a disk, is illustrated by arrows $AF_{OD}$, $AF_{MD}$, and $AF_{ID}$, respectively. The scale provided in FIG. 6 shows the overall dimensions of the slider ABS 120 to be approximately 0.05 inches in length, 0.039 inches in width and 0.012 inches in height (not shown). The leading edges 130 and 132 of ABS Rail #1 122 and #2 124 are etched at angles $\Theta_1$ and $\Theta_2$, $\Theta_3$ and $\Theta_4$, with respect to the leading edge 126 of the slider, respectively. The angles $\Theta_1$–$\Theta_4$ may be equal or different, and in either event, each may range from approximately 5 degrees to 85 degrees, and preferably greater than 45 degrees. The specifically selected angles may be varied to obtain relatively constant pitch and roll angles for various skew angle ranges, and may correspond to different types of disk drives with actuator arm assemblies having various arm lengths which may result in varying skew angle ranges. As the slider flies above the surface of a rotating disk, the generated air flow runs underneath the ABS Rail #1 122 and Rail #2 124, and in between the rails, towards the trailing edge 128 of the slider. Positive load or pressurization is generated as the air flows beneath the step formed by leading edges 130 and 132 of ABS rails 122 and 124, respectively, thereby creating the necessary lift to enable the slider to fly. In order to achieve an appropriate flying height for the slider, counteracting negative pressurization may be provided when air passes over the shallow step region 144 formed at the leading ABS edge 126 and into the deep etch step region 142 towards the trailing edge 128 of the slider ABS. While the relatively deep etch step 142 and shallow step regions 144 may be etched, ion milled, or otherwise formed, at different depths with respect to the height of the ABS rails 122 and 124, the deep etch is preferably formed at a depth of approximately 70 microinches to approximately 200 microinches, and the shallow step is preferably formed at a depth of approximately 10 microinches to approximately 50 microinches, each relative to the height of the rails. The transitional area between the deep step 142 and shallow step 144 regions may also vary in shape, and may be defined by a nonlinear boundary 143 as specifically shown in FIG. 6.

The ABS illustrated in FIG. 6 provides a subambient pressure air bearing slider with a relatively constant flying height, and minimal variations in pitch and roll angles. The effect of the step formed by angled faces 131 and 135, and 133 and 137 of ABS Rails #1 and #2, respectively, vary according to the direction of the air flow. The direction of the air flow changes with respect to the leading edge 126 of the slider ABS 120 according to the position of the slider relative to the air flow as it moves between inner and outer diameter regions of the rotating disk. Regardless of the slider position, the air flow is initially drawn into the shallow step region 144 formed at the leading edge of the ABS 126. At inner diameter regions of a rotating disk (not shown), the angled faces 133 and 135 are substantially perpendicular to the direction of the air flow $AF_{ID}$ as shown in FIG. 6. The pressurization resulting from the step effect is optimized here by selecting appropriate valves for $\Theta_1$ and $\Theta_3$, in order to compensate for the decrease in lift ordinarily experienced by a slider when positioned at inner diameter regions where air velocity is generally lower. Similarly, the effect of the step is also felt at outer diameter regions by selecting appropriate valves for $\Theta_2$ and $\Theta_4$, where generally air velocities are higher. In this outer region, the direction of air flow $AF_{OD}$ is substantially perpendicular to the angled faces 131 and 137. As shown in FIG. 6, an intermediate effect of the pressurization due to the step formed by leading edges 130 and 132 is also felt at middle track diameter where the angled faces are is neither parallel nor perpendicular to the air flow $AF_{MD}$. The varying pressurization resulting from the angled leading edges 130 and 132 of the ABS rails provide a relatively constant slider flying height at various disk locations, and improved data transfer capabilities between the transducer 146 and a spinning magnetic disk across what may be referred to as the read/write gap (R/W gap).

As shown in FIG. 6, the inner rail 122 and the outer rail 124 may have effective air bearing surface areas 134 and 136 unique to each rail, respectively, that assist in reducing the effects of flying at skew angles. For example, inner rail 122 may be formed with an effective area and compression length as shown. As the skew angle changes and the slider moves towards outer diameter regions, the decrease of the effective surface area and compression length due to side leakage (reduction in lift where air leaks out of the sides of the rail) is minimized as a result of the shaped air bearing surface 134 of the ABS rail shown in FIG. 6. When the slider moves to inner diameter regions, the effective surface area and may be similarly aligned with the trailing edge of the inner rail 122. As a result of this unique configuration, each rail maintains sufficient pressurization at a wide variety of skew angles whether the slider ABS 120 is positioned at outer, middle or inner regions of the disk. The individualized air bearing surfaces formed in accordance with the present invention thus provide a more constant slider flying height.

The leading rail edges 130 and 132 of the inner and outer rails 122 and 124, respectively, shown in FIG. 6 may also be formed without kinks. For example, $\Theta_1$ may be independently varied to provide sufficient pressurization from the step effect particularly at inner diameter regions. But at the same time, angle $\Theta_5$ performs this function and also determines the extent to which the leading edge 130 of the inner Rail #1 122 is bent towards the middle portion of the slider ABS 120 to maintain adequate pressurization and alignment with the air flow $AF_{OD}$ particularly at outer diameter regions. Similarly, a kink may not necessarily be formed on the outer rail 124 as a result of particular values for $\Theta_4$ and $\Theta_6$. Angle $\Theta_4$ may be varied to generate adequate pressurization resulting from the step effect and air flow particularly at outer diameter regions of $AF_{OD}$. Meanwhile, angle $\Theta_6$ performs this function and also allows the outer Rail #2 leading edge 132 to be aligned with directional air flow at inner diameter regions compression length also decreases for the same reasons. Again, the uniquely configured air bearing surface 134 minimizes the effect of the loss in effective surface area and compression length at inner diameter regions. The unique configuration of the air bearing surface 136 for the outer rail 124 provides similar results at various disk regions. As shown in FIG. 6, the leading edges 130 and 132 for each particular rail may be generally bent away from their respective sides of the slider ABS 120. The leading edge 132 of the outer rail 124, which typically contains the read/write element or transducer 146, may be generally aligned with the direction of the air flow $AF_{ID}$ to maintain adequate pressurization when the slider is in position at inner diameter regions of the disk in order to compensate for the typically lower air velocity in this region. The leading edge 130 of the inner rail 122 is similarly aligned with the direction of the air flow $AF_{OD}$ when the slider is position at outer diameter regions of the disk in order to provide sufficient lift and maintain a relatively constant flying height. As shown in FIG. 6, the trailing edges of the rails 122 and 124 may also be directed towards the middle of the slider ABS 120 to account for changes in directional air flow. When flying at outer diameter regions, the air flow $AF_{OD}$ may be generally aligned with the trailing edge of the outer rail 124. When positioned at inner diameter regions, the air flow $AF_{ID}$ of $AF_{ID}$. As a result, $\Theta_1$ and $\Theta_5$, and $\Theta_4$ and $\Theta_6$ may be changed, respectively, independent from each other thereby avoiding the formation of rail kinks.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of aerodynamic principles and variables, and may be determined, for example, through computer simulation procedures using computer simulation programs such as that developed at the Computer Mechanics Laboratory at the University of California, Berkeley, Calif. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. An air bearing slider comprising:
   a slider body defined by a leading edge and two longitudinal side edges, the slider body having at least first and second longitudinally extending rails each with a height relative to said slider body, an inner side edge and a leading rail edge, a first contiguous step region having a depth relative to and different than the height of said first and second rails, said first step region extending from the leading edge of the slider body over a portion of the slider body to each leading rail edge such that each leading rail edge is spaced from the leading edge of the slider body, and a second deep etch step region between the rails having a depth greater than the depth of said first contiguous step region, wherein the inner side edges of the rails, the first contiguous step region, and the second deep etch step region define a subambient pressure region therebetween when said slider is flown over a moving disk.

2. The air bearing slider as recited in claim 1, wherein the leading rail edges are formed with angled faces in relation to the leading edge of the slider body.

3. The air bearing slider as recited in claim 2, wherein each rail is defined by an outer side edge formed by kinks.

4. The air bearing slider as recited in claim 1, wherein the first step region and the subambient pressure region are separated by a nonlinear boundary.

5. The air bearing slider as recited in claim 4, further comprising a magnetic transducer mounted to at least one of the rails for performing reading and writing functions in relation to a rotating disk.

6. The air bearing slider as recited in claim 1, wherein the first and second longitudinally extending rails each include an outer side rail edge partially surrounded by the contiguous step region.

7. The air bearing slider as recited in claim 1, wherein the first contiguous step region completely surrounds the leading edge of each rail.

8. An air bearing slider comprising:
   a slider body defined by a leading body edge having a first contiguous step region, a second deep etch step region and two side edges, the slider body further having at least two rails with inner edges longitudinally extending along at least a portion of the slider body each with a leading edge bent away from their respective side edges, wherein the first contiguous step region has a depth relative to and different than a height of said first and second rails and extends from the leading edge of the slider body over a portion of the slider body to each leading rail edge such that each leading rail edge is spaced from the leading edge of the slider body, the second step region has a depth greater than the depth of said first contiguous step region, and the second step region, the inner rail edges and the deep etch step region define a subambient pressure region therebetween when said slider is flown over a moving disk.

9. The air bearing slider as recited in claim 8, wherein the two rails further include kinks for contact with varying directional air flow.

10. The air bearing slider as recited in claim 9, wherein the rails include a trailing edge generally bent away from their respective side edges.

11. The air bearing slider as recited in claims 8, further comprising a disk drive actuator arm and gimbal assembly including at least one gimbal wherein the slider body is mounted to the gimbal.

12. The air bearing slider as recited in claim 8, wherein the two rails each include an outer side rail edge partially surrounded by the contiguous step region.

13. The air bearing slider as recited in claim 8, wherein the first contiguous step region completely surrounds the leading edge of each rail.

14. A slider assembly for a disk drive comprising:
    at least one disk drive gimbal; and
    at least one slider mounted to the at least one gimbal, wherein the at least one slider includes negative pressure air bearing surface means for providing a substantially consistent flying height during movement of the slider relative to a rotating disk wherein the air bearing surface means includes at least two rails longitudinally extending along at least a portion of the slider body each with a leading edge such that each leading rail edge is spaced from the leading edge of the slider body, wherein each rail is formed with inner edges that define a subambient pressure region, and a leading edge having a first contiguous step region having a depth relative to and different from a height of said first and second rails and substantially surrounding the leading edge of the rails for contact with varying directional air flow.

15. A magnetic disk drive comprising:
    a rotatable magnetic disk;
    a suspension assembly including an actuator arm assembly having at least one gimbal positioned proximate to the magnetic disk; and
    at least one slider attached to the at least one gimbal and positionable proximate to a surface of the magnetic disk, the slider including a slider body defined by a leading edge, two longitudinal side edges with at least a first and a second rail extending along each side edge of the slider body each with a leading edge, a first contiguous step region having a depth relative to and different than a height of said first and second rails and extending from the leading edge of the slider body over a portion of the slider body to the leading edge of each rail such that each leading rail edge is spaced from the leading edge of the slider body, and a second deep etch region having a depth greater than the depth of said first contiguous step region, wherein the inner edge of each rail, the first contiguous step region and the second deep etch step region define a subambient pressure region therebetween when said slider is flown over a moving disk.

16. The magnetic disk drive as recited in claim 15, wherein the first and second rails each include an outer side rail edge partially surrounded by the contiguous step region.

17. The magnetic disk drive as recited in claim 15, wherein the first contiguous step region completely surrounds the leading edge of each rail.

18. An air bearing slider comprising:
    a slider body defined by a leading edge and two longitudinal side edges, the slider body having at least first and second longitudinally extending rails each with a height and a rail surface, an inner side edge and a leading rail edge, a first contiguous step region extending from the leading edge of the slider body over a portion of the slider body to each leading rail edge such that each leading rail edge is spaced from the leading edge of the slider body, and a second deep etch step region between the rails, said second deep etch step region having a depth greater than a depth for said first contiguous step wherein said contiguous step is substantially parallel to the rail surfaces of the first and second rails and at a height different from the height of the first and second rails, and wherein the inner side edges of the rails, the first contiguous step region, and the second deep etch step region define a subambient pressure region therebetween when said slider is flown over a moving disk.

* * * * *